United States Patent [19]

Wheeler

[11] 4,030,182

[45] June 21, 1977

[54] TAG APPLICATING DEVICE

[75] Inventor: Philip T. Wheeler, DeWitt, Mich.

[73] Assignee: The Hardy Company, Lansing, Mich.

[22] Filed: Oct. 1, 1975

[21] Appl. No.: 618,453

[52] U.S. Cl. .................................. 29/816; 29/788; 29/243.56; 53/138 R

[51] Int. Cl.[2] .......................................... B23Q 7/10

[58] Field of Search ......... 29/212 D, 211 D, 200 B, 29/200 H, 270, 243.56, 212 R; 53/138, 138 A; 140/93 A, 53; 227/120; 40/11 A

[56] References Cited

UNITED STATES PATENTS

| | | | |
|---|---|---|---|
| 2,242,502 | 5/1941 | Bangs | 29/270 X |
| 2,968,042 | 1/1961 | Yankee | 29/212 D |
| 3,114,200 | 12/1963 | DiMarzio | 29/212 R X |
| 3,734,377 | 5/1973 | Munn | 227/120 |
| 3,945,238 | 3/1976 | Eckert | 29/243.56 X |

*Primary Examiner*—Victor A. DiPalma
*Attorney, Agent, or Firm*—Price, Heneveld, Huizenga & Cooper

[57] ABSTRACT

A tag applicating device includes a pair of crimping pliers having a magazine for sequentially supplying the pliers with fasteners and a tag holding and dispensing magazine coupled to the pliers. The tag holding and dispensing magazine is oriented so as to utilize the fasteners themselves as a registering stop. Alternatively, an adjustable stop may be provided such that individual tags can be advanced and registered with respect to the crimping pliers for application of the tags to objects such as branches or the like with the fasteners passing through the tag as the fastener is clamped around the branch.

11 Claims, 7 Drawing Figures

TAG APPLICATING DEVICE

BACKGROUND OF THE INVENTION

The present invention relates to manual tag applicating devices and more particularly, to means for positioning a tag from a supply of tags in predetermined registration with respect to a portable, manually operated applicating tool.

Tags which are particularly adapted for use in the nursery business usually utilize wire as a fastening device. The tags purchased by the retailer rarely have wire fasteners attached since once they have been attached to the tags, the tags can become entangled by the fasteners in storage, requiring significant time in untangling the tags for subsequent application to a plant.

Thus, the fastener and tags are generally separately applied by the nurseryman which is a time-consuming chore. Furthermore, during transportation of the plants to the retailer, in the loading and unloading of the stock, tags frequently are accidentally removed. Oftentimes, tags are blown off in the sales yard.

SUMMARY OF THE INVENTION

In order to overcome the difficulties encountered when manually applying tags utilizing relatively unskilled labor, the apparatus of the present invention incorporates a fastening tool including a magazine for holding therein a plurality of tags in a predetermined, registered position with such fastening device such that the tags can be advanced into position for applying the tags to a branch or the like using the fastening device.

In the preferred embodiment of the invention, the applicating device comprises a crimping pliers including a supply of sequentially advanced fasteners therein and a magazine for holding a plurality of tags in a predistorted position such that they can easily be individually separated. The magazine may include an adjustable stop for positioning the leading edge of the tag, each of which includes a ring receiving aperture therein, in position with respect to the jaws of the crimping pliers. Preferably, however, the magazine is oriented such that the tag is advanced into a registered position against the fastener itself. In both embodiments, as the pliers are operated, the fastener passes through the aperture in the aligned tag and can be applied to an object simply by positioning the crimping pliers with the fastener surrounding the object as the pliers are closed.

The present invention, its features, advantages and objects, can best be understood by referring to the following description thereof together with the drawings in which:

DETAILED DESCRIPTION OF THE PREFERRED EMBODIMENT

Figure 5:
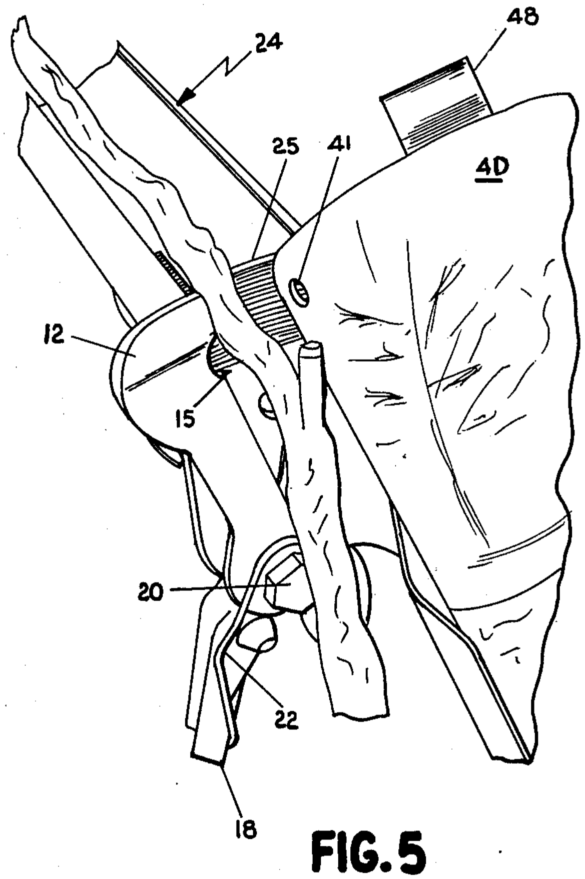
FIG. 5 is an enlarged fragmentary perspective view of the apparatus shown in position for application of a tag to a tree branch.
Figure 1:
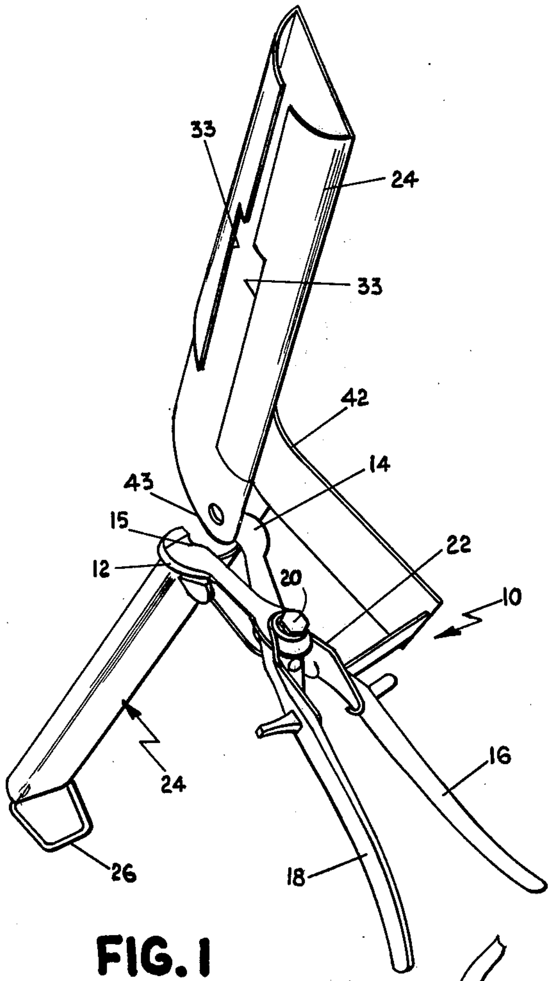
FIG. 1 is a perspective view of the preferred embodiment of the present invention.

As seen in FIG. 1, the preferred embodiment comprises a pair of crimping pliers 10 including jaw members 12 and 14 integrally formed with handles 16 and 18 respectively. The handles are pivoted by means of a pivot bolt 20 around which there is provided a bias spring 22 for biasing the jaws 12 and 14 in a normally open position. Each of the jaws includes configurated recesses 15 to accommodate generally U-shaped deformable wire fasteners 25 (FIGS. 5, 6 and 7) which are sequentially fed to the jaws of the pliers by means of a magazine 24. Magazine 24 includes a spring mechanism 26 for sequentially advancing the endmost of the fasteners into the jaw area for application of the fasteners in applying a tag to an object. Crimping pliers 10 are commercially available including the magazine for the fasteners and can be of the type generally described and disclosed in U.S. Pat. No. 2,502,873 issued Apr. 4, 1950 to B. F. Miltner, the disclosure of which is incorporated herein by reference.

Figure 2:
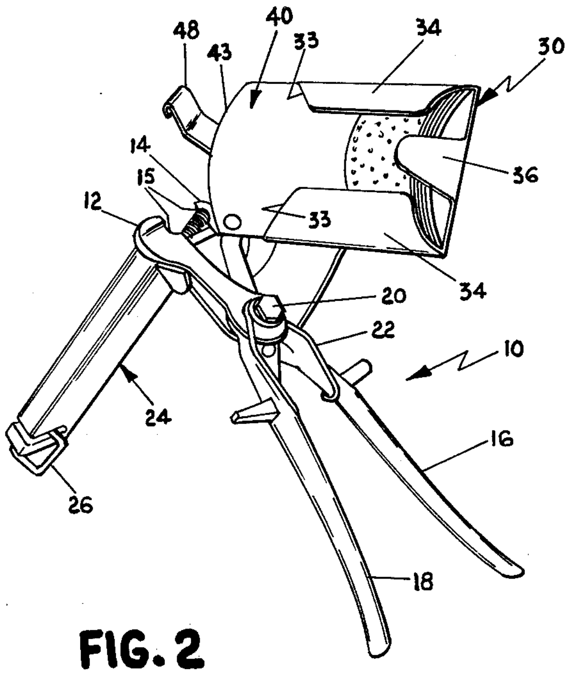
FIG. 2 is a perspective view of an alternative embodiment of the invention.
Figure 4:
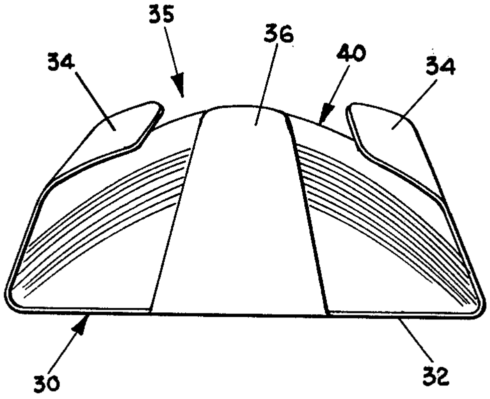
FIG. 4 is an enlarged end view of the tag magazine utilized with the apparatus shown in FIG. 2.

Attached to the pliers 10 is a tag receiving magazine 30 which, as best seen in FIG. 4, comprises a generally rectangular floor 32 having upwardly and inwardly curved side walls 34 facing one another and spaced to define a slot 35 therebetween. Walls 34 have tapered edges 33 (FIG. 1) at the open end of the magazine permitting easy removal of a tag 40 advanced from the magazine. The magazine is adapted to hold a plurality of resilient, generally rectangular tags 40 with the side walls 34 being spaced such that the tags, when fitted in the magazine, as best seen in FIGS. 1 and 4, are deflected or bowed in a convex fashion. This tends to separate the individual tags such that they can be individually advanced which is further enhanced by the curved end plate 36 tending to position the ends of the tags in spaced relationship from each other as seen in FIG. 2. Each tag 40 includes an aperture 41 in the front edge thereof (FIGS. 1, 2, 5–7), which can be located at various points along the edge as required by the end use.

Figure 3:
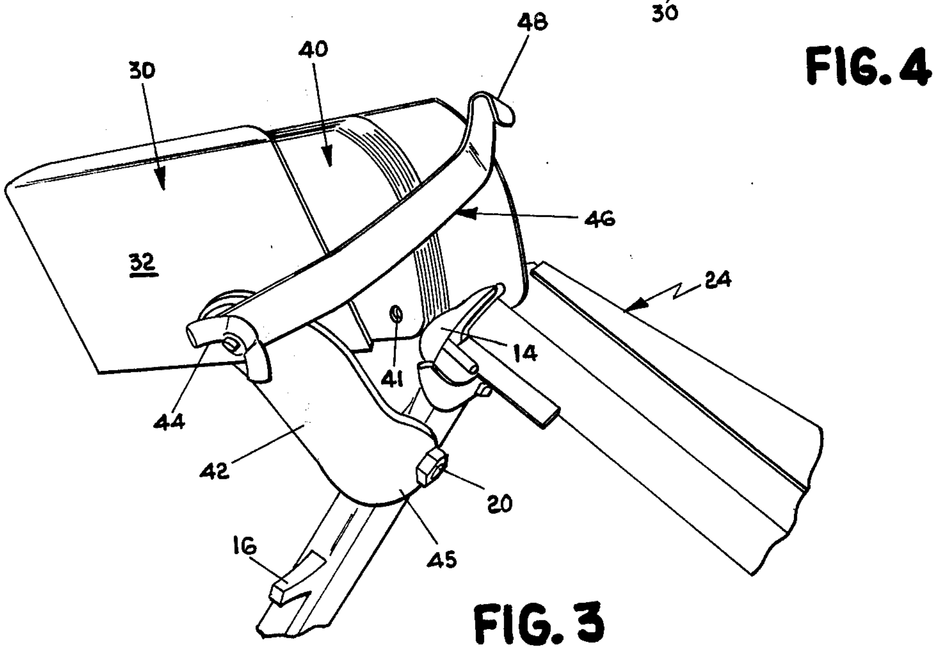
FIG. 3 is an enlarged fragmentary perspective view of the alternative embodiment as viewed from the side opposite that shown in FIG. 2.

The magazine 30 is secured to the crimping pliers 10 by means of a bracket 42 having one end secured to the plate 32 of the magazine by means of a bolt and pin combination 44. Bracket 42 is suitably configurated such that the opposite end 45 of the bracket extends around and under the crimping pliers, as best seen in FIGS. 1, 2 and 3, and is adjustably secured to the pivot bolt 20 thereof.

The bracket 42 and its attachment mechanism to the pliers can be substantially the same in both the FIG. 1 and FIG. 2 embodiments. In FIG. 1, the magazine 30 is tilted and oriented with respect to pliers 10 such that the leading edge 4D of the tag to be applied engages the middle section of the endmost fastener 25 with aperture 41 of the tag in a position to receive the ends of the fastener when the pliers are actuated. Bracket 42 permits alignment of the magazine to achieve this desired result.

In the alternative configuration, integral extension arm 36 extends upwardly and inwardly from one end of plate 32 of magazine 30 and is curved toward the remaining end of the plate.

Registration arm 46 has one end adjustably secured to the plate 32 by means of bolt 44 (FIG. 3) and has an inwardly curved, rounded end 48 extending into the path of travel of the tags as they are individually advanced from the open end of magazine 30 opposite arm 36. Bracket 42 can be adjusted by loosening bolt 20 and pivoting the bracket with respect to pliers 10 or by deforming the bracket. Magazine 30 can be adjusted by loosening bolt and nut 44 and pivoting the magazine with respect to bracket 42. Arm 46 is similarly adjustable by pivoting about bolt 44 or by deformably bending the arm. Magazine 30 and arm 46 are preferably made of sheet metal such as steel. Bracket 42 likewise can be made of sheet steel, preferably somewhat thicker than that used for the magazine 30. Bracket 42, magazine 30 and arm 46 thus may be adjusted to provide the predetermined relative positioning of the tag with respect to the crimping pliers such that aperture 41 will be positioned in alignment with the path of travel of the fastener 25 which passes through aperture 41 when the handles of the crimping pliers are compressed.

In the configuration illustrated in FIG. 1, magazine 30 can be permanently affixed to pliers 10 with no adjustment to utilize a single tag construction. Such an embodiment simplifies the use of the mechanism by unskilled users. It will be recognized that the choice of configuration will be at the option of the user depending on his end use situation.

Figure 6:
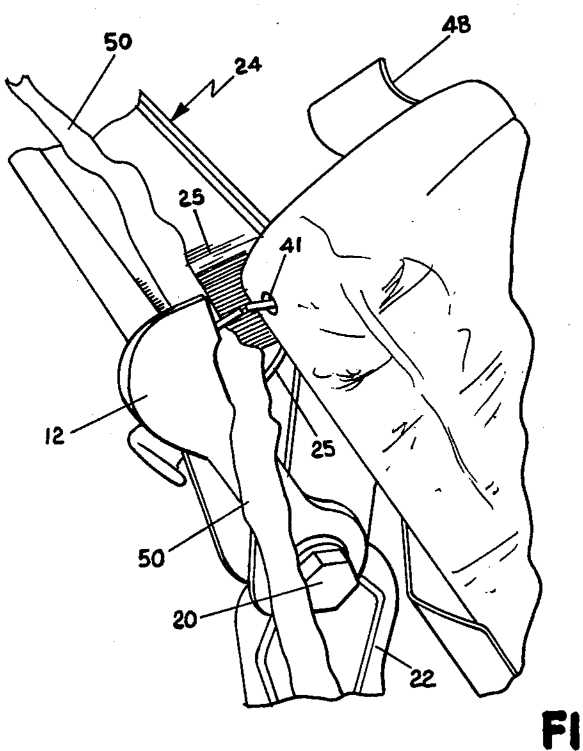
FIG. 6 is an enlarged fragmentary perspective view of the apparatus as the tag is being applied to the branch.
Figure 7:
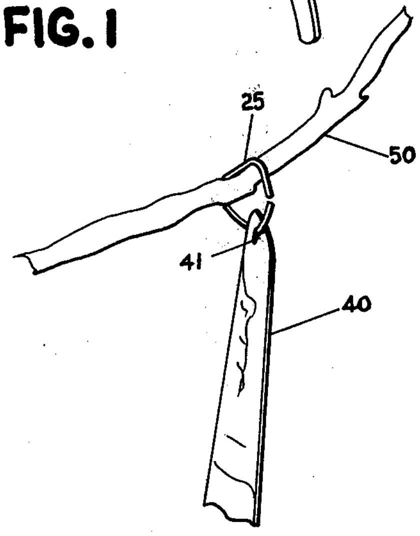
FIG. 7 is a fragmentary perspective view showing the tag as applied to the branch.

In operation, a stack of tags to be applied to nursery stock such as trees is positioned in the magazine, as seen in FIGS. 1–3, and the uppermost tag is manually advanced against either the endmost fastener or the end 48 of arm 46 by sliding the tag with the slot 35 providing an opening such that the user can manually advance the tag into its registered position. A rubber "thumb stall" is a significant aid in doing so. The crimping pliers are then positioned with the jaws on either side of the branch 50 to which the tag is to be attached. The handles 16 and 18 are then compressed such that the endmost fastener surrounds the object and passes through aperture 41 in the tag as shown in FIG. 6. As the pliers are opened, they are removed with a downward motion, thereby pulling the now loosely held tag from the magazine and the next tag is manually advanced into position for attachment.

It will become apparent to those skilled in the art that various modifications to the preferred embodiment can be made without departing from the spirit or scope of the invention as defined by the appended claims.

The embodiments of the invention in which an exclusive property or privilege is claimed are defined as follows:

1. A tag applicating device comprising:

a pair of crimping pliers; and a tag receiving magazine coupled to said crimping pliers for holding a tag advanced from said magazine in position with respect to said crimping pliers such that a fastener positioned to be clamped by said crimping pliers engages the tag for attachment of the tag to an object.

2. The apparatus as defined in claim 1 and further including a registration arm for engaging a tag to hold said tag in a predetermined position with respect to said pliers prior to attachment of said tag.

3. The apparatus as defined in claim 1 wherein said magazine includes a floor and inwardly extending side walls for holding tags in said magazine in a bowed position.

4. The apparatus as defined in claim 3 wherein said magazine further includes an inwardly extending end member for holding tags in said magazine with leading edges of the tags in spaced relationship.

5. The apparatus as defined in claim 4 wherein the leading edge of said side walls are tapered to facilitate removal of a tag advanced from said magazine.

6. The apparatus as defined in claim 1 and further including a registration arm for engaging a tag to hold said tag in a predetermined position with respect to said pliers prior to attachment of said tag and wherein said magazine includes a floor and inwardly extending side walls for holding tags in said magazine in a bowed position wherein the leading edge of said side walls are tapered to facilitate removal of a tag advanced from said magazine into engagement with said registration arm.

7. The apparatus as defined in claim 6 wherein said registration arm is adjustable with respect to said magazine.

8. A tag applicating device for dispensing and applying tags to an object comprising:

fastening means and a fastening tool for attachment of said fastening means to an object;

a tag magazine holding a plurality of tags in position for selective dispensing of individual tags therefrom;

means for coupling said magazine to said fastening tool such that tags partly removed from said magazine are positioned with respect to said fastening tool such that said fastening means extends through the tag as said fastening tool is actuated for securing the tag to an object; and a registration arm coupled to said magazine for holding a tag in a registered position partly removed from said magazine.

9. The apparatus as defined in claim 8 wherein said magazine includes a floor with inwardly extending side walls for holding the tags in a bowed position in said magazine and an inwardly extending end member for holding the tags in said magazine with leading edges spaced from one another.

10. The apparatus as defined in claim 9 and further including a registration arm for engaging a tag to hold said tag in a predetermined position with respect to said fastening tool, wherein the leading edge of said side walls are tapered to facilitate removal of a tag advanced from said magazine into engagement with said registration arm.

11. The apparatus as defined in claim 8 wherein said registration arm is adjustable with respect to said magazine.

* * * * *